(12) United States Patent
Croteau

(10) Patent No.: US 6,320,277 B1
(45) Date of Patent: Nov. 20, 2001

(54) TIRE ALERT SYSTEM

(76) Inventor: Roger Croteau, 367 Albert Street E., Alliston, Ontario (CA), L9R 1J9

( * ) Notice: Subject to any disclaimer, the term of this patent is extended or adjusted under 35 U.S.C. 154(b) by 0 days.

(21) Appl. No.: 09/526,913

(22) Filed: Mar. 16, 2000

(51) Int. Cl.$^7$ .................................................. B60C 23/00
(52) U.S. Cl. ........................ 307/10.1; 307/9.01; 340/443; 73/651
(58) Field of Search .................................... 307/9.1, 10.1; 340/447, 442, 438, 457, 459; 73/146.5; 701/29, 31; 180/271; 280/755

(56) References Cited

U.S. PATENT DOCUMENTS

| | | | |
|---|---|---|---|
| 4,458,535 | * 7/1984 | Juergens | 73/651 |
| 6,028,508 | * 2/2000 | Mason | 340/443 |
| 6,144,904 | * 11/2000 | Tseng | 701/34 |

\* cited by examiner

*Primary Examiner*—Fritz Fleming
*Assistant Examiner*—Robert L Deberadinis

(57) ABSTRACT

A warning system to alert the driver of a vehicle that a tire or wheel on the vehicle has become loose or a tire tread is separating from a tire core is disclosed. The warning system comprises a first metallic member mounted to the vehicle, a second metallic member mounted adjacent the surface of the tire being monitored and in a spaced-apart relationship with respect to the first member and an insulating member interposed between the first and second members forming a normally open electrical contact between the first and second members. When a tire or wheel becomes loose on the vehicle or a tire tread starts separating from its tire core, the surface of the tire contacts the second member causing it to move laterally and contact the first member resulting in the closing of the normally open electrical contact between the first and second members causing an audible and visual alarm to be actuated alerting the driver of the vehicle of a dangerous condition.

4 Claims, 2 Drawing Sheets and it can be installed on tractor trailers, vans,

TIRE ALERT SYSTEM

TECHNICAL FIELD

The present invention relates, in general, to a device which provides an indication when a tire or wheel becomes loose on a vehicle and, more particularly, to a device that provides both an audible and visual warning to the vehicle driver when a tire or wheel becomes loose on a vehicle.

BACKGROUND ART

Various types of sensors are available to determine the condition or state of tires on a vehicle, however, such sensors usually detect tire pressure and provide an indication when the tire pressure is either excessively high or extremely low. Such sensors do not provide any type of indication as to whether the tire and/or wheel on which it is mounted is loose. Typically, the driver of a vehicle, particularly a truck, is unaware of the condition of the tires or wheels when operating same. In addition, since many truck tires are of the "re-cap" type, the truck driver is unaware when the tire tread becomes separated from the tire core and "flies off" same. Such a situation creates a significant danger particularly to those vehicles in the vicinity of the truck. The drivers of the vehicles in the vicinity of the truck will attempt to avoid hitting or being hit by the tire tread which has separated from the tire core and which is flying off of same. By attempting to avoid hitting or being hit by the tire tread, the drivers of the adjacent vehicles may swerve to avoid same and, while swerving, will create a very dangerous condition which might result in an accident. Such accidents, since they typically are at high rates of speed, can be very severe and can result in serious injuries and/or deaths. In view of this, it has become desirable to develop a relatively inexpensive device to provide an immediate audible and visual indication to the vehicle driver that one of the tires and/or wheels on his vehicle is loose or that the tire tread is separating from the tire core. By providing such an audible and visual alarm, the vehicle driver can take the necessary steps to safely stop the vehicle.

THE INVENTION

The present invention provides a warning to a vehicle driver of the existence of a loose tire or wheel on his vehicle or the separating of a tire tread from a tire core by providing a device which is mounted adjacent the outer surface of the tire and which is activated when the surface of the tire contacts same. The device is comprised of an L-shaped metallic member and a spaced-apart metallic arm member with an insulator interposed therebetween. The end of the arm member is bent so as to be adjacent to the L-shaped member resulting in the creation of a normally open electrical contact between the tip of the arm member and the L-shaped member. When the tire and/or wheel becomes loose or when the tire tread starts separating from the tire core, the outer surface of the tire tread contacts the arm member causing the tip on the end thereof to contact the L-shaped member closing the normally open electrical contact between same resulting in the actuation of an audible and visual alarm alerting the driver of the vehicle of a dangerous condition permitting the driver to take the necessary steps to safely stop the vehicle.

DESCRIPTION OF THE PREFERRED EMBODIMENT

Figure 1:
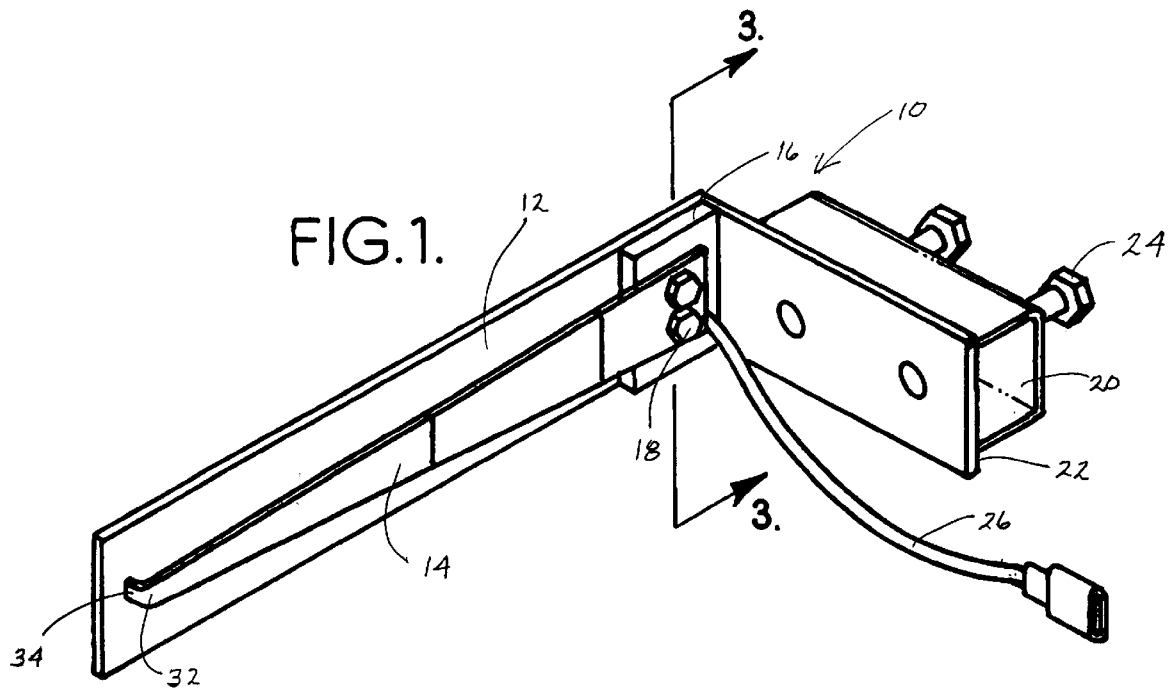
FIG. 1 is a perspective view of the tire alert system of the present invention.
Figure 2:
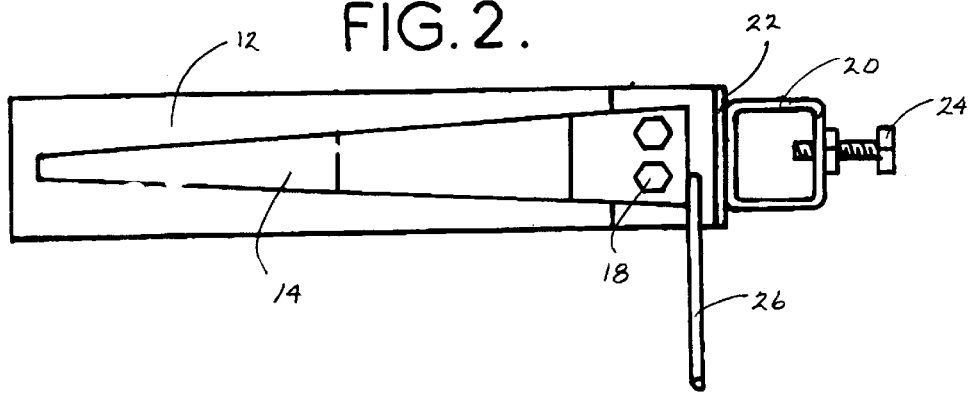
FIG. 2 is a side elevational view of the present invention.
Figure 3:
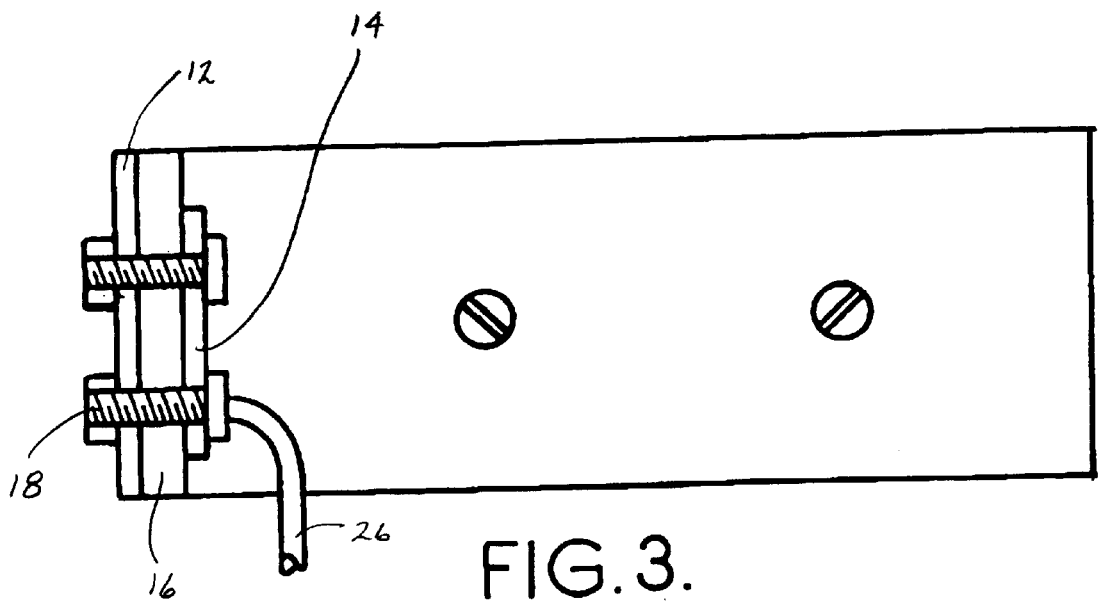
FIG. 3 is a cross-sectional view taken across section indicating lines 3—3 in FIG. 1.
Figure 4:
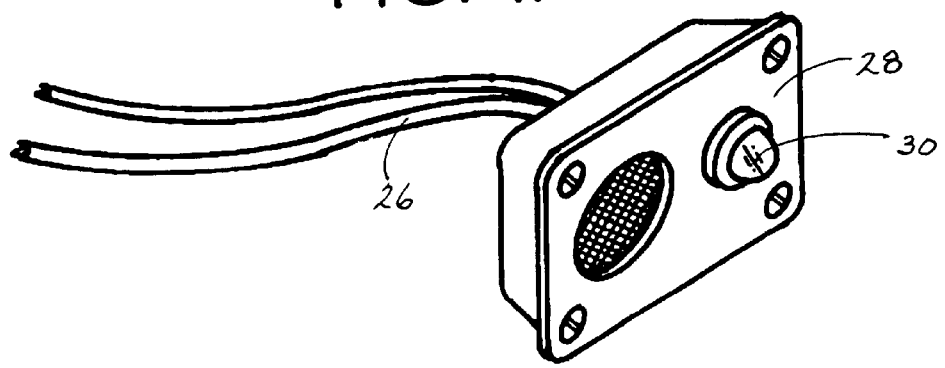
FIG. 4 is a perspective view of the alarm device actuated by the present invention.

Referring now to the Figures where the illustrations are for the purpose of describing the preferred embodiment of the present invention and are not intended to limit the invention described herein, FIG. 1 is a perspective view of the tire alert device 10 of the present invention. The tire alert device 10 is comprised of an L-shaped member 12 formed from a metallic material, an arm member 14 similarly formed from a metallic material, an insulating member 16 interposed between one end of the arm member 14 and the end of the L-shaped member 12 adjacent the 90 degree bend in the L-shaped member 12, a plurality of fasteners 18 retaining the arm member 14, the insulating member 16 and the L-shaped member 12 together, a square tubular member 20 attached to the outer surface of portion 22 of the L-shaped member 12 and a plurality of mounting bolts 24 received within the square tubular member 20. In addition, a wiring harness 26 is attached to the tire alert device 10 such that a first electrical conductor (not shown) is attached to L-shaped member 12 and a second electrical conductor (not shown) is attached to arm member 14. The wiring harness 26 is connected to an alarm device 28 which provides both an audible alarm and a visual alarm through the electrical bulb 30 incorporated therein, as shown in FIG. 4. The alarm device 28 is mounted within the cab of the vehicle to provide an audible and visual alarm to the driver of same.

The arm member 14 is formed from metallic material but may be covered with a plastic coating. One end 32 of arm member 14 is bent so as to be directed toward the L-shaped member 12, however, the tip 34 of end 32 is not covered with a plastic coating and is in a spaced-apart relationship with respect to the L-shaped member 12. In essence, the metallic tip 34 of end 32 of arm member 14 and the adjacent metallic surface of L-shaped member 12 form a normally open electrical contact which can be closed by movement of arm member 14 toward L-shaped member 12.

The tire alert device 12 is installed on a vehicle by mounting the L-shaped member 12 adjacent to the outer surface of the tire to be monitored. Both the L-shaped member 12 and the arm member 14 should not be touching the outer surface of the tire during normal operation. If the tire or the wheel on which the tire is mounted becomes loose or the tire tread starts to separate from the tire core when the vehicle is being operated, the outer surface of the tire will contact the arm member 14 causing tip 34 on end 32 of arm member 14 to contact the L-shaped member 12 closing the normally open electrical contact between same resulting in the actuation of alarm device 28 providing both an audible and visual alarm to the driver of the vehicle. In this manner, the driver of the vehicle can stop the vehicle before the tire and/or wheel becomes disengaged from the vehicle axle or before the tire tread separates completely from the tire core. In essence, the tire alert device 10 acts as a normally open electrical switch which closes when the tire or wheel becomes loose or when the tire tread starts separating from the tire core and, upon closing, actuates an audible and visual alarm alerting the driver of an unsafe condition. It should be noted that the use of this system is not limited to trucks and it can be installed on tractor trailers, vans, automobiles, and other type of vehicle. Furthermore, the tire alert device 10 can be sold in various sizes and with various types of mounting hardware so that it can be utilized on different types of vehicles.

Certain modifications and improvements will occur to those skilled in the art upon reading the foregoing. It is understood that all such modifications and improvements have been deleted herein for the sake of conciseness and readability, but are properly within the scope of the following claims.

I claim:

1. A tire condition warning device for a vehicle comprising a first member mounted to the vehicle, a second member positioned in a spaced-apart relationship with respect to said first member and adjacent the surface of the tire being monitored, and an insulating member interposed between said first member and said second member forming a normally open electrical contact between said first and second members, lateral movement of the surface of the tire being monitored causing said tire surface to contact said second member causing said second member to move laterally with respect to said first member closing said normally open electrical contact between same.

2. The device as defined in claim 1 wherein the end of said second member is bent so as to form a tip, said tip being adjacent to and in a spaced-apart relationship with respect to first member.

3. The device as defined in claim 1 further including a first electrical conductor connected to said first member and a second electrical conductor connected to said second member.

4. The device as defined in claim 3 further including an alarm means, said alarm means being electrically connected to said first and second electrical conductors and being actuated by the closing of said normally open electrical contact formed between said first and second members.

* * * * *